G. DOUGLASS.
Carriage Spring.
No. 78,439.
Patented June 2, 1868.
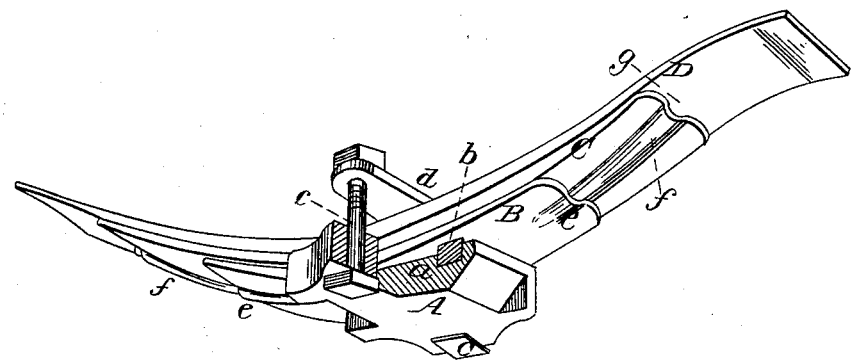
Witnesses
W. C. Ashkettle
J. A. Fraser
Inventor
Geo. Douglas
per Munn & Co.
Attorneys.

United States Patent Office.

GEORGE DOUGLASS, OF BRIDGEPORT, CONNECTICUT.

Letters Patent No. 78,439, dated June 2, 1868.

IMPROVEMENT IN CARRIAGE-SPRING.

*The Schedule referred to in these Letters Patent and making part of the same.*

TO ALL WHOM IT MAY CONCERN:

Be it known that I, GEORGE DOUGLASS, of Bridgeport, in the county of Fairfield, and State of Connecticut, have invented a new and useful Improvement in Springs for Vehicles; and I do hereby declare that the following is a full, clear, and exact description thereof, which will enable others skilled in the art to make and use the same, reference being had to the accompanying drawings forming part of this specification.

This invention relates to a new and useful improvement in springs for vehicles, and more especially refers to an improvement on a spring, for which Letters Patent were granted to me, bearing date May 26, 1863.

The present invention consists in dispensing with the usual ribs and slots, which are now used to prevent the leaves from shifting laterally, and substituting, for said ribs and slots, taper longitudinal ribs, swaged in the leaves in such a manner that the under projecting surfaces of the ribs of one leaf will fit into the concave formed by the ribs of the leaf underneath, by which arrangement the lateral and longitudinal shifting of the leaves is entirely prevented.

The invention further consists in the application of India-rubber bearings to the cast-metal seat of the spring, as hereinafter fully shown and described, whereby jars and concussions are, in a great measure, prevented from being transmitted from the seat to the spring, and a greater yielding movement or play allowed the latter.

The accompanying drawing represents a perspective view of my invention.

A represents a cast-metal socket or seat. Cast iron will of course be most generally used. This seat is substantially the same as the one shown and described in my Letters Patent of 1863, with the exception that it is cast with two chambers or recesses $a\ a$, one of which is shown clearly in the drawing, to receive India-rubber strips $b$.

B C D represent the leaves of the springs, any suitable or desired number of which may be used. The leaves are secured to the seat by a clamp, composed of two bolts $c\ c$, and a cross-bar, $d$, substantially the same as in the patent above alluded to.

The rubber strips $b$ project a trifle above the seat A, so as to afford good bearing-surfaces for the lower and shorter leaf B, as shown in the drawing. This leaf B, near each end, is swaged longitudinally, so as to have ribs $e\ e$, concave at their upper sides, convex at their lower sides, and of gradual taper-form, the ribs slightly expanding from their inner to their outer ends.

The leaf C above B is provided, at each end, with similar ribs $f$, the inner ends of which are fitted in the ribs $e\ e$.

The upper leaf D is provided with ribs $g$, which are fitted in the ribs $f$ of leaf C.

By this arrangement it will be seen that the lateral shifting of the leaves B C D is effectually prevented, while at the same time the depressions of the leaves is restricted in an eminent degree, in consequence of the ribs of one leaf wedging or binding in the ribs of the one below, a result due to the taper-form of the ribs.

This swaging of the ribs on the leaves serves to strengthen them, whereas the slots and ribs at present used for preventing the lateral shifting of the leaves weaken the latter.

The India-rubber strips $b\ b$ admit of a greater yielding of the leaf B than it would otherwise have, as the outer parts of said leaf are kept elevated by them above the bed of the seat, and greater play is consequently allowed the leaf.

Having described my invention, I claim as new, and desire to secure by Letters Patent—

The insertion of India-rubber strips $b\ b$ in chambers or recesses $a\ a$, in the cast-metal socket or seat A of the spring, substantially in the manner as and for the purpose herein set forth.

GEORGE DOUGLASS.

Witnesses:
SAMUEL LINE,
HENRI FRANKE.